INVENTOR
VIRGIL L. FRANTZ

United States Patent Office 3,057,331
Patented Oct. 9, 1962

3,057,331
PNEUMATIC MOTOR
Virgil L. Frantz, Salem, Va., assignor to Graham-White Sales Corporation, Salem, Va., a corporation of Virginia
Filed Feb. 18, 1959, Ser. No. 794,152
13 Claims. (Cl. 121—2)

This invention relates to pneumatic motors and has for its primary object the provision of a pneumatic motor having as its force transmitting means a reciprocable piston which is driven in both directions entirely by pneumatic pressure and requires no pilot valve or other extraneous means for controlling the direction in which the pressure is applied to the piston.

Another object of the invention is to provide a two-way pneumatic motor which requires as a moving part only a reciprocable differential piston and in which the piston is driven in both directions entirely by pneumatic pressure.

An additional object of the invention is to provide a pneumatic motor which not only is double acting entirely under pneumatic pressure, but needs no pilot valve and only a single inlet.

A further object of the invention is to provide a two-way pneumatic motor which is simple and rugged in construction and practically trouble-free in operation and the relatively moving parts of which are assembled and installable and removable as a cartridge.

Another object of the invention is to provide a two-way pneumatic motor which is complete unto itself and will operate at a predetermined rate under a given pneumatic pressure.

Figure 1:
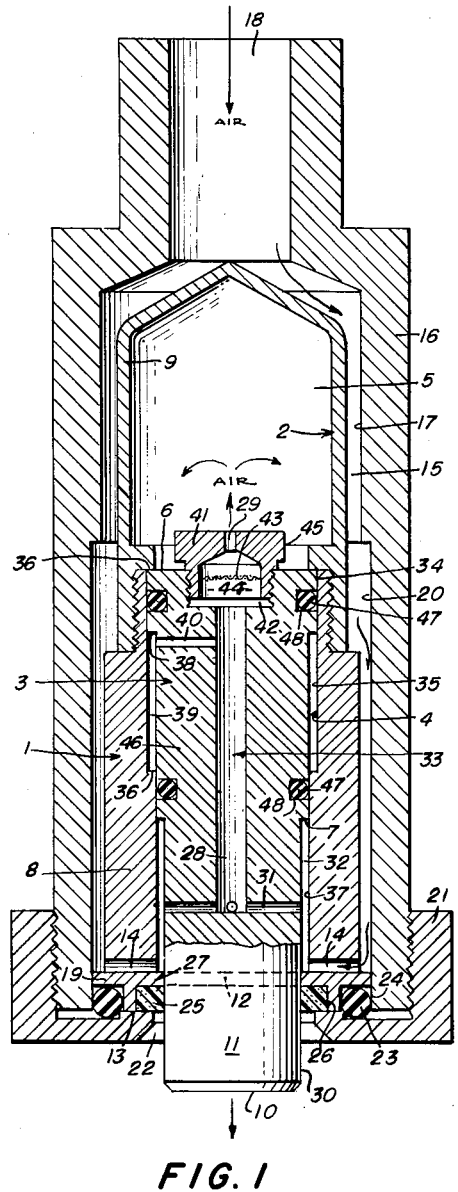
Figure 2:
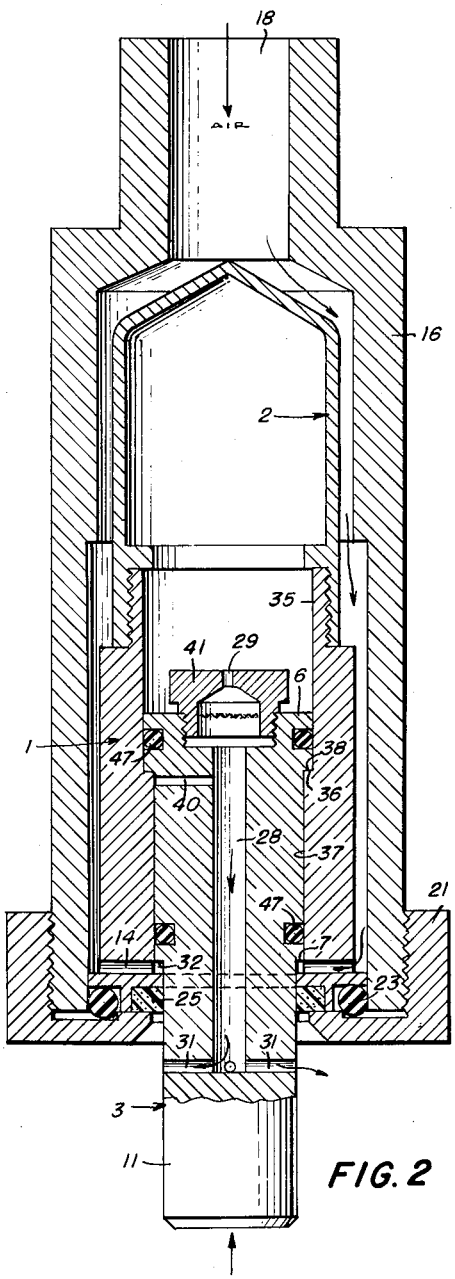

Other objects and advantages of the invention will appear hereinafter in the detailed description, be particularly pointed out in the appended claims and be illustrated in the accompanying drawings, in which:

FIGURE 1 is a vertical sectional view of a preferred embodiment of the pneumatic motor of the present invention with its piston in retracted position; and FIGURE 2 is a view of the motor of FIGURE 1 on the same section, showing the piston in advanced position.

Referring now in detail to the drawings, in which like reference characters designate like parts, the improved pneumatic motor of the present invention is adapted generally for use in any application in which reversing rectilinear motion produced by pneumatic pressure is a suitable power source. Thus, while the illustrated embodiment is designed primarily for use as an automatic bellringer for a locomotive bell, such as shown in my Patent No. 2,739,570, issued March 27, 1956, the pneumatic power may be applied as well to numerous other uses, such as a pneumatic hammer or drill or a pneumatic drive for a windshield wiper or vibrator conveyor. Actuated by pneumatic pressure, the motor ordinarily will be actuated by air and, hereinafter used, the term "air" is to be considered as including air and other gases suitable for the purpose.

Designated as 1, the pneumatic or air motor is comprised essentially of a shell or casing 2, usually stationarily mounted, a differential piston 3 reciprocable in a bore 4 in the shell, an alternately chargeable and exhaustable air chamber 5, the air pressure in which, when charged, exerts on a confronting, exposed or presented surface 6 on the piston an overriding axial force shifting the piston in one direction, and an opposing surface 7 on the piston constantly exposed or presented to any air pressure applied to the motor and effective on exhausting of the air chamber at least to initiate shifting of the piston in the opposite direction. Not only does the pneumatic motor 1 depend for shifting its differential piston entirely on unbalancing of the axial forces exerted by pneumatic pressure on the piston, first in one direction and then in the other, but such alternate unbalancing is derived from motion of the piston, rendering the motor a complete, self-contained, double-acting motor for the operation of which no pilot valve is necessary.

In the illustrated embodiment, the shell or casing 2 is made simply of two axially aligned parts, one a substantially cylindrical sleeve or tubular member 8 extending axially or centrally through which is the bore 4 in which reciprocably slides or rides the piston or plunger 3, which with the bore preferably is cylindrically-sided, and the other a hollow cover cap or container member 9 containing or enclosing the air chamber 5, the container being closed at its inner end and at its opposite end being threaded onto the sleeve 8 so that the inner end of the bore opens onto the air chamber. Both the piston 3 and the bore 4 are of stepped construction, the piston having, intermediate its ends, at least the opposing surface 7 in the form of a differential, preferably annular, shoulder and being reduced in cross-section therebelow or beyond, preferably to its lower or outer end 10, to provide it with a reduced lower end portion 11 which projects or extends through an outlet or mouth 12 of the bore of correspondingly reduced cross-section at or adjacent the lower or outer extremity or end 13 of the sleeve.

Projecting or extending through the sleeve 8 at a position axially or longitudinally thereof constantly to expose the shoulder 7 to any pneumatic pressure applied to the motor 1 over the range of axial movement of the piston 3 are one or more inlet ports 14. Disposed immediately above or inside the mouth 12 of the bore 4, the plurality of ports 14 of the illustrated embodiment are conveniently connected to a reservoir or other suitable source of compressed air (not shown) through an annular inlet passage 15 between the casing 2 of the air motor 1 and a housing 16 in an upwardly or inwardly opening cavity or aperture 17 in which the motor is mounted and which, for use of the motor as a bellringer, may be the hollow standard projecting through the bell (not shown) on which the clapper (not shown) is suspended. To admit compressed air to the inlet passage 15, there is provided in the illustrated housing 16 above the cavity 17 a central opening or way 18, opening at its lower end onto the cavity and suitably connected thereabove to the compressed air source. Fitting loosely in the cavity 17 downwardly to the inlet ports 14 so as to form the inlet passage 15, the casing 2 is here positioned or centered in the cavity by a positioning flange 19 integral with and oustanding radially from the sleeve 8 below the inlet ports and having a sliding fit with the lower end portion of the side wall 20 of the cavity. Once the casing 2 is inserted or seated in the cavity it is releasably held in that position by a closure or collar member 21 threaded onto the lower end of the housing 16 and having a central opening 22 for passing the piston 3, the closure member, when the motor 1 is used as an automatic bellringer, conveniently being formed integrally with a clapper-mounting clevis such as shown in my Patent No. 2,739,570.

Escape of pressure through the joint between the side wall 20 of the cavity 17 and the positioning flange 19 on the sleeve 8, once the casing 2 is seated in the cavity, may be prevented by suitable sealing means, the illustrated O-ring 23 being preferred and conveniently being carried in a downwardly or outwardly facing peripheral groove 24 interrupting the lower end 13 of the sleeve 8 below the positioning flange. A similar function is performed between the sleeve 8 and the piston 3 by a bearing 25 encircling the piston 3 below the mouth 12 of the bore 4 and conveniently carried in a downwardly or outwardly facing groove 26 in the lower end of the sleeve within the groove 24, the bearing 25 and O-ring 23 thus being adapted to be held in place by the cap 21 and readily accessible on removal of the latter. Preferably of the permanent, self-lubricating type, such as lubricant-impregnated "nylon," the bearing 25 also preferably is not an airtight seal, but allows just enough scavenging air to pass during operation of the air motor to prevent entry of dust into as well as accumulation of moisture in the bore 4.

Reciprocable in the bore 4, the piston 3 must be limited in its downward or outward movement or advance or power stroke so that the shoulder 7 will be constantly exposed to any air pressure applied to the air motor, this requiring in the illustrated construction that the shoulder stop short of the mouth 12 of the bore 4 and thus always be either on the upper or inner side of the inlet ports 14 or at least spaced sufficiently above the radially instanding lip 27 on the sleeve 8, defining or demarking the juncture between the mouth and the adjoining portion of the bore, to be exposed to air entering through the inlet ports. The shoulder 7 facing downwardly or outwardly axially of the piston, either literally, if, as preferred, it is flat and radial, or generally in the sense that air pressure acting on the shoulder will exert an axial force on the piston in the opposite or upward or inward direction, the constant exposure of the shoulder to any air pressure applied to the air motor by the limitation imposed on the outward stroke of the piston, will subject the piston to such an axial force at all times during operation of the motor. It is this force, the product of the applied pressure and the effective area of the shoulder 7, in terms of its radial extent, that is depended upon at least to initiate the upward or inward movement or return or retract stroke of the piston 3.

The axial force opposing that on the shoulder 7 is applied through the air chamber-confonting surface 6 on the piston, here its upper or inner end surface which, in keeping with the terminology employed in connection with the shoulder, either literally or generally in the sense of the direction of the axial force exerted through it on the piston by air pressure, faces oppositely to or opposes the shoulder and faces toward or in the direction of or confronts the cir chamber 5. Necessarily having an effective area in terms of its radial extent greater than that of the shoulder 7, the inner end surface 6 or portion thereof presented or offered to air in the air chamber 5, will enable that air, when the chamber is charged to the pressure on the shoulder, to overbalance the opposing axial force of the air on the shoulder and by the resultant outward axial force, power the outward movement or advance stroke of the piston. Thus, if the air chamber 5 is alternately charged and discharged, the axial forces of air pressure on the differential piston 3 will be unbalanced, first in one direction and then in the other, causing the piston to reciprocate entirely in response to air pressure.

The air chamber 5 may be charged and discharged in sequence or alternation as the piston 3 approaches or reaches the limits or ends of its return and advance strokes through a central or axial passage, way or bore 28 in the piston, which opens at its inner or upper end onto and is in constant communication with the air chamber 5 through an aligned orifice 29 formed in or, and preferably, carried by the piston. The central passage 28 extends beyond or below the shoulder 7 but terminates short of the outer or lower end 10 of the piston 3 and, at or adjacent its own lower end, opens onto the cylindrical side 30 of the outer end portion 11 of the piston through one or more preferably radial access openings or ports 31. The length of the central passage 28 and the position or disposition of its access openings 31, axially of the piston, are such that the access openings, in the retracted position of the piston shown in FIGURE 1, will be within and open onto the bore 4 in the casing 2 inwardly of or above the inlet ports 14, and as the piston 3 approaches its extended position shown in FIGURE 2, will pass through or clear the mouth 12 of the bore 4 and the encircling or girdling washer 25 and open, exteriorly of the casing 2, onto atmosphere. As a consequence, the air chamber 5 will be connected, through the inlet ports 14 and the axially variable annular passageway or space 32 between the side 30 of the lower end portion 11 of the piston 3 and the adjoining portion of the bore 4 in the sleeve 8, to the compressed air source in the retracted position and over the inner or upper part of the reciprocable movement of the piston 3, and to atmosphere over the outer or lower part of such movement of the piston. The air chamber 5 thus is enabled alternately to be charged with compressed air and discharged, exhausted or bled to atmosphere, the former over the inner and the latter over the outer part of the reciprocable movement of the piston with the rate of both charge and discharge controlled or determined by the size or diameter of the orifice 29.

In functioning dually to enable the air chamber 5 alternately to be charged and discharged, the through passage 33 in the piston formed by the central passage 28 and its associated orifice 29 and access openings 31, serves, as the piston 3 begins its advance or power stroke, to permit air in the passageway 32 to escape to the air chamber as the latter expands. However, once the access ports 31 enter the mouth 12 of the bore 4, between the passageway 32 and the through passage 33 is blocked, so that when the access ports subsequently are opened to atmosphere, the pressure applied to the motor 1 will remain on the shoulder 7 but reduce progressively on the end surface 6 with bleeding of the air chamber 5. Accordingly, the pressure on the shoulder 7 is enabled to serve first to cushion the advance or power stroke of the piston as it nears its limit and then, as the outward axial force exerted through the end surface 6 falls below the inward axial force exerted through the shoulder, at least initiate the return or retract stroke of the piston.

For the air motor 1 to operate as intended, it is, of course, essential that the piston 3 be limited in the extent of its reciprocable movement in the bore 4. This is readily accomplished by providing as the inner or upper end portion of the piston 3 a relatively enlarged, integral head 34 which rides or slides in an upper portion or cylinder 35 of corresponding enlargement or increased cross-section of the bore 4 between a pair of annular abutments or stops 36, instanding preferably radially from the casing 2 and axially spaced to accommodate or encompass and limit to the desired extent the range of reciprocable movement of the piston. Of the pair of abutments 36, the lower or outer conveniently is formed on the sleeve 8 at the juncture of the upper cylinder 35, with the coaxial, relatively smaller lower cylinder 37, which together form the bore 4. The upper or inner of the abutments 36 is formed on the cover 9 and the position or disposition of the two abutments, axially of the casing 2, is such that the outer abutment is always above or inside the shoulder 7.

Having as its inner or upper surface the inner end surface 6 of the piston 3, the head 34 has as its undersurface a preferably radially extending annular projection or shoulder 38 which, rather than depend entirely on the inward axial force exerted through the shoulder 7 to power the piston in its return or retract stroke, preferably is employed as a means for augmenting or supplementing that force. To this end, the axially variable annular compartment or space 39 in the upper cylinder 35 below the head 34 is connected to the central passage 28 in the piston 3 by a preferably radial drilling or access opening or port 40 of such size or diameter relative to that of the orifice 29 when compared with the relative volumes of the compartment 39 and air chamber 5 as fully to charge the compartment substantially on or shortly after initial introduction of compressed air into the central passage 28 and well in advance of charging of the air chamber 5 and the shoulder 38 facing, literally or generally, in the same outward or downward axial direction as the shoulder, the return stroke of the piston 3 will be initiated by air pressure on the lower shoulder 7 but continued once the access openings 31 are within the mouth 12 of the bore 4 by the joint action of the air pressure on both the lower shoulder and the upper shoulder 38. This, in turn, to enable the piston to be powered in its advance stroke, necessitates that the combined effective area of the two shoulders be less than the effective area of the inner end surface 6 presented to the air chamber 5 in the retracted position of the piston. The access opening 40 to the compartment 38 not only enables the compartment to be charged during the retract stroke of the piston, but by constantly communicating with the through passages 33 and therethrough interconnecting the compartment and the air chamber 5, prevents air from being trapped within the compartment during the advance stroke and thus interfering with that stroke by bleeding air from the compartment during the advance stroke initially to the air chamber and subsequently to atmosphere as the access openings 31 in the piston clear the outer end 13 of the sleeve 8.

Although formable integrally with the piston 3, the orifice 29 between the central passage 28 in the piston and the air chamber 5 preferably is formed in a plug 41 separate from and threadable into an axial socket 42 in the inner end of the piston so as to enable the size of the orifice and thus the rate of charge and discharge of the air chamber and the speed of the motor for a given applied pressure to be changed to suit a particular application without change in the remaining components. Since the air chamber 5 is not readily self-cleaning, it is preferred that a screen or other suitable filter 43 be interposed between the orifice 29 and the central passage 28, the filter conveniently being seated either in the socket 42 below the plug 41 or, as here, in an enlarged downwardly or outwardly opening cavity 44 formed in the underside of the plug and tapering upwardly toward the orifice 29. Hex- or like-headed to facilitate its application and removal, the plug, to the extent of the difference in effective area between the inner and outer surfaces of its head 45 exposed to air in the chamber 5, serves as part of the inner end surface 6 of the piston 3 which is responsible for the latter's advance stroke.

Stepped twice in the preferred embodiment, once at the inner or upper shoulder 38 between its head 34 and intermediate portion or stem 46 and again at its outer or lower shoulder 7 on its stem 46 between the latter and its lower end portion 11, the preferred piston 3 has two main sliding or working contacts with the bore 4, one of the head 34 with the inner cylinder 35, and the other of the stem 46 with the outer cylinder 37. Sealing of the passageway 32, compartment 39 and air chamber 5 from each other being necessary at one time or another during operation of the air motor and this not being derivable solely from the sliding contact between the piston 3 and the bore 4, leakage of air therebetween about the piston is prevented by sealing means preferably in the form of a pair of O-rings 47, both conveniently carried by and seating in annular grooves 48 in the piston, one in the head 34 and the other in the stem 46 of the piston adjacent the outer shoulder 7 and always outwardly of the outer abutment 36. The upper or head O-ring and lower or stem O-ring thus are contained in and wipe, respectively, against the upper cylinder 35 and the lower cylinder 37. Both these cylinders preferably are chrome-plated for maximum operating efficiency of the O-rings 47, regardless of lubrication.

A double acting or two-way motor actuated entirely by pneumatic pressure and requiring but one moving part, the piston 3, the air motor 1, for a given applied pressure, may be varied in speed by changing the size of the orifice 29 or in speed and power by relatively varying within limits the effective areas of its opposing surfaces, the outer and inner shoulders 7 and 38 and the inner end surface 6. Thus, for example, if, without change in the other surfaces, the width of the outer shoulder is doubled, say, from $1/32$ inch to $1/16$ inch, the speed of the motor will be substantially doubled and its power on the retract stroke correspondingly increased. Also, in common with other fluid motors, both the speed and power of the motor 1, without any change in its structure, will vary over a wide range in correspondence with variations in the applied pressure. The air motor of the illustrated embodiment has the further important advantage that it is a self-contained cartridge or unit which may be applied and removed as such without disturbing any air connection to the housing 16 in which it is designed to be installed. Normally held or locked in the casing 2 by the containment of its head 34 axially between abutments 36 on the sleeve and cover, the piston, on removal of the motor 1 from the housing 16, is made readily disassemable from the casing for repair or replacement of any part simply by unscrewing the cover 9 from the sleeve 8.

The manner in which the reversing rectilinear motion of the piston 3 is utilized and the relative power of its advance and return strokes will depend on the installation. Thus, when used as either an automatic bellringer or a pneumatic hammer or drill, the piston itself ordinarily will act directly on the clapper or other object to which power is to be applied and power will be needed mainly on the advance stroke with only sufficient required on the retract stroke to withdraw or return the piston to retracted position. However, if used to drive such a device as a windshield wiper or a pneumatic conveyor, the piston ordinarily will be connected at all times to the object to be driven and will require substantially equal power on both its advance and retract strokes. If desired for a particular installation, the reversing rectilinear motion of the piston may readily be adapted by a suitable mechanical connection to impart oscillating or rotary motion to the driven object.

From the above detailed description, it will be apparent that there has been provided an improved air motor having as its single moving part a differential piston reciprocable entirely by pneumatic pressure, the motor being complete unto itself in requiring no pilot valve or other extraneous means for controlling the direction in which the pneumatic pressure is applied to the piston. It should be understood that the described and disclosed embodiment is merely exemplary of the invention and that all modifications are intended to be included which do not depart from either the spirit of the invention or the scope of the appended claims.

Having described my invention, I claim:

1. A pneumatic motor comprising a casing having a bore, a chamber in said casing and opening onto said bore, a differential piston reciprocable within limits in said bore, a supply port opening onto an outer end portion of said bore, a surface on said piston and exposed to pneumatic pressure from said supply port at the end of a power stroke and during a retract stroke of said piston, said surface facing to enable said pressure to apply a force in one axial direction to said piston, a second surface on said piston facing to enable pneumatic pressure exerted thereon to apply an axial force on said piston opposing said first-named force and exposing to said chamber an effective area greater than that of said first surface, passage means in said piston and opening directly to atmosphere beyond said casing at said end of said power stroke for alternately charging and discharging said chamber and thereby reciprocating said piston by correspondingly reversing the direction of the resultant axial force exerted by the applied pressure thereon, sealing means carried by said piston and sealingly engaging said bore between said chamber and surface, and sealing means interposed between said piston and casing and disposed outwardly of said supply port and surface at said end of said power stroke.

2. A pneumatic motor comprising a casing having a bore, a chamber in said casing and opening onto said bore, a differential piston reciprocable within limits in said bore, a plurality of axially spaced surfaces on said piston and facing to enable pressure applied thereto to apply a force in one axial direction to said piston, one of said surfaces being constantly exposed to pressure applied to said motor for initiating and partially powering a retract stroke of said piston, another of said surfaces being disposed inwardly of said first surface and exposed to said pressure after initiation of said retract stroke for assisting the pressure applied to said one surface in powering said stroke, a surface on said piston facing to enable pneumatic pressure exerted thereon to apply an axial force on said piston opposing said first-named force and exposing to said chamber an effective area greater than that of said plurality of surfaces, and means for alternately connecting said chamber to said applied pressure and to atmosphere and correspondingly reversing the direction of the resultant force exerted by said applied pressure on said piston.

3. A pneumatic motor comprising a casing, a chamber in said casing, a bore in said casing and opening at its outer end exteriorly thereof and at its inner end onto said chamber, inlet port means through said casing to said bore inwardly of said outer end thereof, a differential piston reciprocable within limits in said bore, shoulder means on said piston facing toward said outer end of said bore, certain of said shoulder means being constantly exposed to pneumatic pressure applied to said motor for initiating and partially powering a retract stroke of said piston, another of said shoulder means being disposed inwardly of said certain shoulder means and exposed to said pressure after iniitation of said retract stroke for assisting pressure on said certain shoulder means on powering said stroke, an inner end surface on said piston opposing said shoulder means and presenting to said chamber an effective area greater than that of said shoulder means, and passage means in said piston and constantly open to said chamber for alternately connecting said chamber to said applied pressure and to atmosphere.

4. A pneumatic motor comprising a casing, a chamber in said casing, a cylindrical bore in said casing and opening at its outer end exteriorly thereof and at its inner end onto said chamber, said bore including an outer cylinder and a connected coaxial inner cylinder of relatively greater cross-section, a differential piston having a head and stem respectively corresponding in cross-section to and sliding in said inner and outer cylinders, axially spaced means in said casing and engageable with means on said piston for limiting reciprocable movement thereof, inlet port means through said casing to said outer cylinder, shoulder means on said stem and facing outwardly toward said outer end of said bore, said shoulder means being contained in said outer cylinder and constantly exposed to pneumatic pressure applied to said motor through said inlet port means, shoulder means on said head and facing in the same direction as said first shoulder means, an inner end surface on said piston facing inwardly toward and presenting to said chamber an effective area greater than the combined effective areas of said shoulder means, and passage means in said piston and effective on reciprocation thereof for alternately connecting said inner cylinder and chamber to said applied pressure and to atmosphere.

5. A pneumatic motor comprising a casing, a chamber in said casing, a cylindrical bore in said casing and opening at its outer end exteriorly thereof and at its inner end onto said chamber, said bore including an outer cylinder and a connected coaxial inner cylinder of relatively greater cross-section, a differential piston having a head and stem respectively corresponding in cross-section to and sliding in said inner and outer cylinders, axially spaced means in said casing and engageable with means on said piston for limiting reciprocable movement thereof, inlet port means through said casing to said outer cylinder, shoulder means on said stem and facing outwardly toward said outer end of said bore, said shoulder means being contained in said outer cylinder and constantly exposed to pneumatic pressure applied to said motor through said inlet port means, shoulder means on said head and facing in the same direction as said first shoulder means, an inner end surface on said piston facing inwardly toward and presenting to said chamber an effective area greater than the combined effective areas of said shoulder means, said inner cylinder and chamber being interconnected through said piston, and passage means in said piston and effective on reciprocation thereof for alternately connecting said inner cylinder and chamber to said applied pressure and to atmosphere.

6. A pneumatic motor comprising a casing, a chamber in said casing, a cylindrical bore in said casing and opening at its outer end exteriorly thereof and at its inner end onto said chamber, said bore including an outer cylinder and a connected coaxial inner cylinder of relatively greater cross-section, a differential piston having a head and stem respectively corresponding in cross-section to and sliding in said inner and outer cylinders, axially spaced means in said casing and engageable with means on said piston for limiting reciprocable movement thereof, inlet port means through said casing to said outer cylinder, shoulder means on said stem and facing outwardly toward said outer end of said bore, said shoulder means being contained in said outer cylinder and constantly exposed to pneumatic pressure applied to said motor through said inlet port means, shoulder means on an outer end of said head and facing in the same direction as said first shoulder means, an inner end surface on said piston facing inwardly toward and presenting to said chamber an effective area greater than the combined effective areas of said shoulder means, passage means in said piston and effective on reciprocation thereof for alternately connecting said inner cylinder and chamber to said applied pressure and to atmosphere, and plug means removably inserted in an inner end of said piston and having an orifice open to said passage means and chamber for regulating the rate of charge and discharge of said chamber.

7. A pneumatic motor comprising a casing, a chamber in said casing, a cylindrical bore in said casing and opening at its outer end exteriorly thereof and at its inner end onto said chamber, said bore including an outer cylinder and a connected coaxial inner cylinder of relatively greater cross-section, a differential piston having a head and stem respectively corresponding in cross-section to and sliding in said inner and outer cylinders, axially spaced means in said casing and engageable with means on said piston for limiting reciprocable movement thereof, inlet port means through said casing to said outer cylinder, shoulder means on said stem and facing outwardly toward said outer end of said bore, said shoulder means being contained in said outer cylinder and constantly exposed to pneumatic pressure applied to said motor through said inlet port means, shoulder means on said head and facing in the same direction as said first shoulder means, an inner end surface on said piston facing inwardly toward and presenting to said chamber an effective area greater than the combined effective areas of said shoulder means, passage means in said piston and effective on reciprocation thereof for alternately connecting said inner cylinder and chamber to said applied pressure and to atmosphere, plug means insertable in an inner end of said piston and having an orifice open to said passage means and chamber for regulating the rate of charge and discharge of said chamber, and filter means in said piston between said passage means and orifice.

8. A pneumatic motor comprising a casing, a chamber in said casing, a cylindrical bore in said casing and opening at its outer end exteriorly thereof and at its inner end onto said chamber, said bore including an outer cylinder and a connected coaxial inner cylinder of relatively greater cross-section, a differential piston having a head and stem respectively corresponding in cross-section to and sliding in said inner and outer cylinders, abutments instanding from said casing at opposite ends of said inner cylinder and alternately engageable with said head for limiting reciprocable movement of said piston, inlet port means through said casing to said outer cylinder, shoulder means on said stem and facing outwardly toward said outer end of said bore, said shoulder means being contained in said outer cylinder and constantly exposed to pneumatic pressure applied to said motor through said inlet port means, shoulder means on said head and facing in the same direction as said first shoulder means, an inner end surface on said piston facing inwardly toward and presenting to said chamber an effective area greater than the combined effective areas of said shoulder means, and passage means in said piston and effective on reciprocation thereof for alternately connecting said inner cylinder and chamber to said applied pressure and to atmosphere.

9. A pneumatic motor comprising a casing, a chamber in said casing, a cylindrical bore in said casing and opening at its outer end exteriorly thereof and at its inner end onto said chamber, said bore including an outer cylinder and a connected coaxial inner cylinder of relatively greater cross-section, a differential piston having a head and stem respectively corresponding in cross-section to and sliding in said inner and outer cylinders, axially spaced means in said casing and engageable with means on said piston for limiting reciprocable movement thereof, inlet port means through said casing to said outer cylinder, shoulder means on said stem and facing outwardly toward said outer end of said bore, said shoulder means being contained in said outer cylinder and constantly exposed to pneumatic pressure applied to said motor through said inlet port means, shoulder means on said head and facing in the same direction as said first shoulder means, an inner end surface on said piston facing inwardly toward and presenting to said chamber an effective area greater than the combined effective areas of said shoulder means, a central passage in said piston and open to said chamber and extending therefrom toward the outer end of said piston, access port means opening from said passage onto a side of said piston below said first shoulder means and positioned axially of said piston alternately to connect said passage to said outer cylinder and to atmosphere, and access port means in said piston intermediate said head and said first-named access port means for connecting said passage to said inner cylinder, said passage and access port means being effective on reciprocation of said piston for alternately connecting said chamber and inner cylinder to said applied pressure and to atmosphere.

10. A pneumatic motor comprising a casing, a chamber in said casing, a cylindrical bore in said casing and opening at its outer end exteriorly thereof and at its inner end onto said chamber, said bore including an outer cylinder and a connected coaxial inner cylinder of relatively greater cross-section, a differential piston having a head and stem respectively corresponding in cross-section to and sliding in said inner end outer cylinders, axially spaced means in said casing and engageable with means on said piston for limiting reciprocable movement thereof, inlet port means through said casing to said outer cylinder, shoulder means on said stem and facing outwardly toward said outer end of said bore, said shoulder means being contained in said outer cylinder and constantly exposed to pneumatic pressure applied to said motor through said inlet port means, shoulder means on said head and facing in the same direction as said first shoulder means, an inner end surface on said piston facing inwardly toward and presenting to said chamber an effective area greater than the combined effective areas of said shoulder means, passage means in said piston and effective on reciprocation thereof for alternately connecting said inner cylinder and chamber to said applied pressure and to atmosphere, and sealing means in said casing between said outer and inner cylinders and between said inner cylinder and chamber for sealing against leakage of pressure therebetween about said piston.

11. A pneumatic motor comprising a casing, a chamber in said casing, a cylindrical bore in said casing and opening at its inner end onto said chamber and at its outer end through a restricted outlet exteriorly of said casing, a differential piston reciprocable in said bore, axially spaced means in said casing and engageable with means carried by said piston for limiting the reciprocable movement thereof, shoulder means on said piston intermediate ends and facing outwardly toward an outer end thereof, said piston outwardly of said shoulder means having an outer end portion of reduced cross-section bounded inwardly by said shoulder means and projecting through said restricted outlet, bearing means carried by said casing and encircling said end portion outwardly of and substantially sealing said outlet, inlet port means in said casing inwardly of said outlet for admitting to said bore pneumatic pressure applied to said motor, said shoulder means over the range of reciprocable movement of said piston being constantly exposed to said applied pressure, an inner end surface on said piston facing inwardly toward and presenting to said chamber an effective area greater than that of said shoulder means, means carried by said piston for sealing against leakage thereabout between said bore and chamber, and passage means in said piston and effective on reciprocation thereof for alternately connecting said chamber to said applied pressure and to atmosphere.

12. A pneumatic motor comprising a housing, a cavity in said housing and connectable through a way therein to a source of pneumatic pressure, an air motor inserted into said cavity through an outer end thereof, said motor including a casing having a positioning flange outstanding radially from an outer end portion thereof and slidably engaging said cavity, said casing above said flange loosely fitting said cavity, closure means threaded onto said housing about said cavity for releasably holding said casing in said cavity, a chamber in an inner end portion of said casing, a cylindrical bore in said casing and opening at its inner end onto said chamber and at its outer end through a restricted outlet and an opening in said closure means exteriorly of said housing, a differential piston reciprocable in said bore and having an outer end portion of reduced cross-section projecting through said restricted outlet thereof beyond said casing, an outwardly facing shoulder on said piston at an inner end of said outer end portion, axially spaced means in said casing and engageable with means carried by said piston for limiting the reciprocable movement thereof, inlet port means in said casing inwardly of and adjacent the restricted outlet of said bore for connecting said bore to said cavity about said casing, said shoulder over the range of reciprocable movement of said piston being constantly exposed to pressure applied to said motor through said inlet port means, means carried by said casing and held in position by said closure means for sealing against pressure leakage between said casing and said housing and piston, an inner end surface on said piston facing inwardly toward and presenting to said chamber an effective area greater than that of said shoulder, passage means in and effective on reciprocation of said piston for alternately connecting said chamber to said applied pressure and to atmosphere, and sealing means carried by said piston intermediate said shoulder and inner end surface for sealing said bore against leakage about said piston between said inlet port means and chamber.

13. A pneumatic motor comprising a sleeve member, a cover member releasably secured to an inner end of said sleeve member and enclosing a chamber, an axial bore in and extending through said sleeve member and opening at an inner end onto said chamber, a piston reciprocable in said bore and having an outer end projecting from an outer end thereof exteriorly of said sleeve member, a head on said piston, radially outstanding means on said piston and engageable with means instanding from said sleeve member for limiting relative axial movement of said piston in one direction, means instanding from said cover member and spaced axially from said first-named instanding means and alternately engageable with said outstanding means for limiting relative axial movement of said piston in the opposite direction and releasably holding said piston in assembled relation in said bore, inlet port means in said sleeve member to said bore for applying pneumatic pressure to said piston, outwardly facing shoulder means on said piston intermediate ends thereof, certain of said shoulder means being constantly exposed to pressure applied to said motor through said inlet port means, an inner end surface on said piston facing inwardly toward and presenting to said air chamber an effective area greater than the effective area of said shoulder means, and means in said piston and operative on reciprocation thereof for alternately connecting said chamber to applied pressure and to atmosphere.

References Cited in the file of this patent

UNITED STATES PATENTS

| | | |
|---|---|---|
| 1,707,972 | Bridgham | Apr. 9, 1929 |
| 1,929,197 | Bridgham | Oct. 3, 1933 |
| 2,536,595 | Dittmann | Jan. 2, 1951 |
| 2,739,570 | Frantz | Mar. 27, 1956 |
| 2,862,475 | Kinsman | Dec. 2, 1958 |